United States Patent
Yang et al.

(10) Patent No.: US 10,473,945 B2
(45) Date of Patent: Nov. 12, 2019

(54) METHOD FOR TUNING A THREE-DIMENSIONAL IMAGE AND A DISPLAY APPARATUS THEREOF

(71) Applicant: CheRay Co. Ltd., Hsinchu (TW)

(72) Inventors: Chun-Hsiang Yang, Hsinchu (TW); Yi-Pai Huang, Hsinchu (TW); Chih-Hung Ting, New Taipei (TW); Kai-Chieh Chang, Kaohsiung (TW); Jui-Yi Wu, Miaoli County (TW)

(73) Assignee: CHERAY CO. LTD., Hsinchu (TW)

(*) Notice: Subject to any disclaimer, the term of this patent is extended or adjusted under 35 U.S.C. 154(b) by 8 days.

(21) Appl. No.: 15/922,022

(22) Filed: Mar. 15, 2018

(65) Prior Publication Data
US 2019/0219832 A1    Jul. 18, 2019

(30) Foreign Application Priority Data

Jan. 12, 2018    (TW) .............................. 107101243 A

(51) Int. Cl.
*G02B 27/22*    (2018.01)
*H04N 13/00*    (2018.01)
(Continued)

(52) U.S. Cl.
CPC .......... *G02B 27/22* (2013.01); *G02B 27/0955* (2013.01); *G06T 15/08* (2013.01);
(Continued)

(58) Field of Classification Search
CPC ...... H04N 13/00; H04N 13/10; H04N 13/302; G02B 27/2214
See application file for complete search history.

(56) References Cited

U.S. PATENT DOCUMENTS

2013/0088487 A1*   4/2013   Lipton ..................... H04N 5/72
                                                            345/419
2016/0077349 A1    3/2016   An
(Continued)

FOREIGN PATENT DOCUMENTS

| CN | 105430369 A | 3/2016 |
| TW | 201728963 A | 8/2017 |
| TW | 201735634 A | 10/2017 |

*Primary Examiner* — Matthew Salvucci
(74) *Attorney, Agent, or Firm* — Li & Cai Intellectual Property (USA) Office

(57) ABSTRACT

The disclosure is related to a method for tuning a three-dimensional image, and a display apparatus thereof. In the method, an integral image composed of multiple element images and used to reproduce a three-dimensional image is obtained. The pixel values of every element image are extracted. Depending on hardware configuration, a certain range of the pixels within one-dimensional pixels of the element image are selected. The pixel values of the selected pixels are filled in the zones divided from the one-dimensional pixels in an ascending order or a descending order, and/or with continuously-duplicate values according to pixel numbers of the selected pixels. A new element image is therefore formed. By repeating these steps, a new integral image can be created. This new integral image effectively reduces the difference between the image regions and won't make a viewer see the uncomfortable three-dimensional image due to the excessively large difference.

15 Claims, 7 Drawing Sheets

(51) Int. Cl.
 *H04N 13/10* (2018.01)
 *H04N 13/302* (2018.01)
 *G02B 27/09* (2006.01)
 *G06T 15/08* (2011.01)
 *H04N 13/332* (2018.01)

(52) U.S. Cl.
 CPC ............ *H04N 13/00* (2013.01); *H04N 13/10* (2018.05); *H04N 13/302* (2018.05); *H04N 13/332* (2018.05)

(56) References Cited

U.S. PATENT DOCUMENTS

2016/0191904 A1 6/2016 An
2018/0184075 A1* 6/2018 Park .................... H04N 13/373

\* cited by examiner

METHOD FOR TUNING A THREE-DIMENSIONAL IMAGE AND A DISPLAY APPARATUS THEREOF

BACKGROUND OF THE INVENTION

1. Field of the Invention

The disclosure is related to a method and an apparatus for tuning an image; more particularly it is to a method for solving the problem of uncomfortable 3D image through tuning the element images to reproduce the 3D image, and a display apparatus thereof.

2. Description of Related Art

A variety of conventional methods are available for generating three-dimensional images. Some of the conventional technologies for generating 3D images are based on the principle of binocular parallax with respect to one object. One kind of the three-dimensional images is formed from two images that enable human eyes to see their tiny difference. The other kinds of the three-dimensional images are formed in human eyes by playing a series of different images in a loop. A pair of special glasses, e.g. the anaglyph glasses, polarizing glasses or shutter glasses, is usually required to see the 3D image. The images are projected onto a human's eyes and formed as the 3D image with a depth in a brain due to the binocular parallax.

One another way to generate 3D images is by virtue of a three-dimensional display device that includes the optical elements. Without any specific glasses, the device allows users to see 3D images through their naked eyes. In this situation, users can see 3D images with a depth at a specific viewing angle when the eyes perceive the images with a difference.

However, in the conventional naked-3D technology, while the 3D image viewer moves, his sight also moves from one image region to another image region of the 3D image. In the meantime, a large pixel difference between the image regions will cause jittering or vibrating images, thus resulting in uncomfortable feelings toward the viewer.

SUMMARY OF THE INVENTION

The disclosure related to a method or a system for tuning a 3D image has been carried out to provide a solution to the problem of image jittering and the uncomfortable viewing experience for a viewer when he moves while watching the 3D image. The viewer may see the jittering 3D image when he is moving because an image difference between image regions of the 3D image is large. One of the objectives of the method and the system for tuning the 3D image of the disclosure is to tune the smoothness of the element images that composes an integral image used to reproduce the 3D image. The uncomfortable viewing experience can be solved by tuning the smoothness since it reduces effectively the image difference between the image regions.

In one of the embodiments, the method for tuning the 3D image includes firstly acquiring an integral image that is used to reproduce the 3D image. The integral image is composed of a plurality of element images, and the smoothness of each of the element images can be tuned by the method for solving the excessively large image difference between the image regions of the 3D image. The method should still keep a certain level of image features for reproducing the 3D image. Next, the method obtains pixel values of the element image, and selects a range of pixels from one-dimensional pixels of the element image. The one-dimensional pixels are then divided into multiple zones. The pixel values of the selected pixels are used to fill into the pixels of every zone in an ascending order, in a descending order, or with continuously-duplicate pixel values, or in a combination thereof according to pixel numbers of the selected pixels. A new element image is therefore created. After repeating the above steps such as selecting the range of pixels from the one-dimensional pixels, and filling the pixel values into the divided multiple zones, a new integral image is formed.

The above method can also be adapted to two dimensional images of one element image. A determination of the range of pixels selected from the one-dimensional pixels is based on physical information of multi-optical elements of a display apparatus that is used to display the 3D image. The physical information is such as a spatial position of the 3D image and a spatial relation between the optical elements and a display panel of the display apparatus.

According to one of the embodiments of the display apparatus, the display apparatus includes a multi-optical element module for reproducing the 3D image, a display unit for displaying the integral image, a display driving unit for driving the display unit, and an image processing unit. The image processing unit is used to perform the method.

In the display apparatus of the embodiment, the physical information relating to the multi-optical element module at least includes a spatial relation between the position for projecting the 3D image and each of the multiple optical elements, and a spatial relation between the optical element and the display panel. The optical element indicates a lens set and a plurality of lens sets that form a lens array.

DETAILED DESCRIPTION OF THE PREFERRED EMBODIMENTS

The present invention will now be described more fully with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
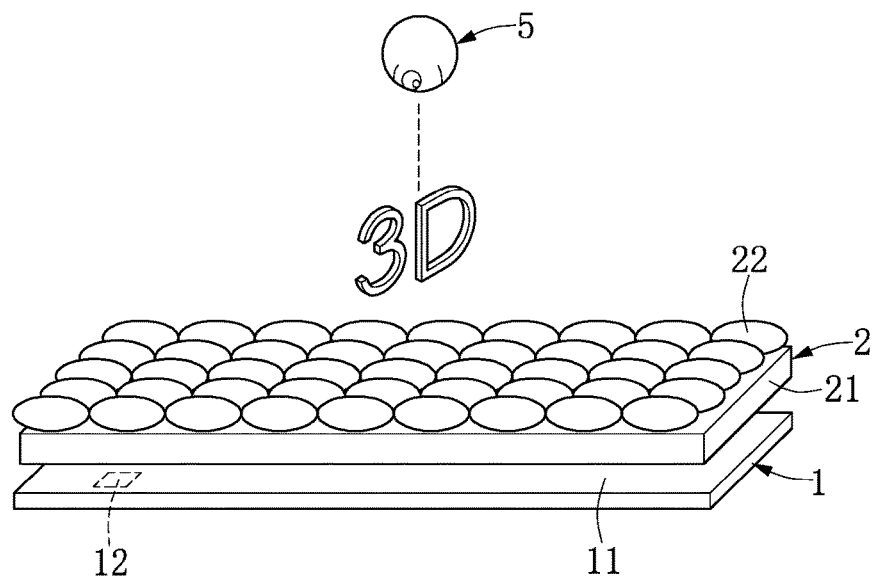
FIG. 1 shows a schematic diagram depicting a display apparatus for rendering a three-dimensional image according to one embodiment of the disclosure.

The embodiment of the disclosure describes a method for tuning a three-dimensional image, and a display apparatus thereof. The method is adapted to a display apparatus including multi-optical elements for purpose of reproducing the three-dimensional image. FIG. 1 shows a schematic diagram of the display apparatus according to one embodiment of the disclosure.

This diagram shows the structure of the display apparatus of the system for reproducing the three-dimensional image. A display panel 1 may be a liquid-crystal display panel having a backlight module (not shown in the diagram). The backlight module may be a self-emissive organic light-emitting diode (OLED), but not limited to any specific type of backlight. A display image 11 displayed on the display panel 1 is an integral image that is created through a rendering process. The integral image is constituted of multiple element images. The element images are one-to-one corresponding to the multiple lens sets of a multi-optical element module 2. The element images of the display image 11 can correspond to the images with respect to the positions of the lens sets in a one-to-one, one-to-many or many-to-one manner.

In the multi-optical element module 2, a base 21 and the lens assembly 22 are included. The optical element of the lens assembly 22 may be a lens set. One lens set can be constituted of one or more convex lenses and concave lenses. The multi-optical elements form a lens array. A three-dimensional image is displayed through the multi-optical element module 2. A position and an angle relating to the display apparatus of a viewing position 5 will affect the formation of the integral image and the element image. An image processing unit 12 of the display apparatus is generally used to process the input images, e.g., rendering the three-dimensional image, and also to perform a computer process for reproducing the 3D image. By the image processing unit 12, the viewing position 5, a position for displaying the three-dimensional image, the physical properties of the lens sets of the multi-optical element module 2, and spatial relations among the elements of the display apparatus are referred to adjusting the reference, calculating the element images and rendering the integral image. In one embodiment of the system, the system can adaptively provide a proper content according to a user's viewing position 5 even if the user changes his viewing position. The image processing unit 12 is such as a digital signal processor (DSP) or a microprocessor, and is used to perform the method for tuning the 3D image.

The display apparatus can be an electronic device, such as a mobile phone, a tablet computer or a personal computer, which includes a flat display. The display panel 1 is disposed at a lower layer of the display apparatus. The display panel 1 is in charge of displaying a plane image that has not yet been reproduced by light. In general, the display panel 1 is mainly used to display the integral image. The multi-optical element module 2 is disposed at an upper layer of the display apparatus. The multi-optical element module 2 is configured to regulate a light field. For example, the angle of light for the three-dimensional image can be regulated for re-arranging and constituting the plane image that has not yet been re-arranged. In the present embodiment, the integral image can be configured to display the three-dimensional image by re-arranging and constituting the lights through the multi-optical element module 2.

The multi-optical element module 2 may be, exemplarily, a lens array including multiple lens sets. A lens assembly 22 is therefore formed. The physical properties of the lens assembly 22 are such as a refraction index and transmittance that are caused by the texture and curvature of the lens. The number and arrangement of the lens sets of the lens array and disposition of the display panel 1 dominate a height, a range of viewing angle, and a resolution of the three-dimensional image.

The lens set can be a single lens, a lens array, a lenticular lens, or a Fresnel lens. While in the process of imaging, a pin hole, a pin-hole array, a barrier and/or a specific point light source can be applied to the imaging. The display apparatus or a display array displays the image and reproduces the three-dimensional image at a predetermined position.

Figure 2:
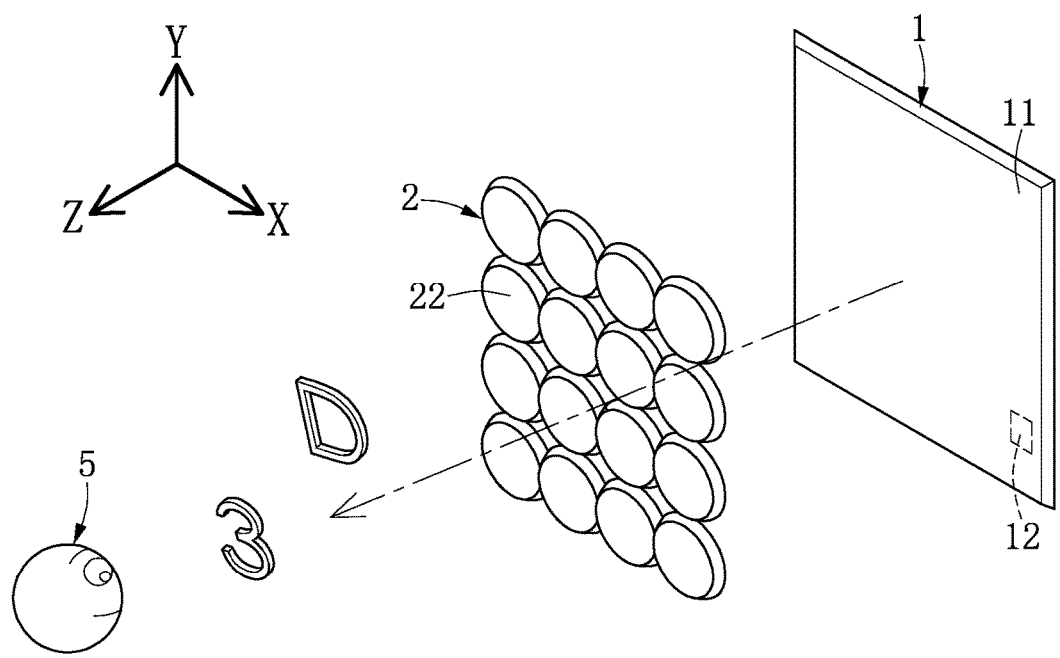
FIG. 2 shows another schematic diagram depicting a display apparatus for rendering a three-dimensional image in one further embodiment of the disclosure.

Reference is next made to FIG. 2, which shows another schematic diagram of the display apparatus for generating the three-dimensional image in one embodiment of the disclosure. In the process of rendering the 3D image, the display panel 1 displays the integral image by arranging the element images. The three-dimensional image can therefore be reproduced through the multi-optical element module 2.

According to the embodiment shown in the diagram and in view of the description of FIG. 1, the user is allowed to see a floating three-dimensional image from a viewing position 5. The three-dimensional image is such as a display image 11 that is displayed through the display panel 1. This display image 11 is an integral image rendered from the element images. Every element image corresponds to one optical element of the multi-optical element module 2. The optical element is such as a lens set.

The floating three-dimensional image is reproduced through the multi-optical element module 2. The lens sets of the lens assembly 22 are disposed at different positions and allow the user to view the image at a viewing position 5. The image passing through every lens set is projected onto a predetermined spatial position. The lens sets at different positions render different image regions because the element images corresponding to the optical elements have a difference from each other.

For example, while reproducing a floating three-dimensional image, the optical element on the left side of reproduced three-dimensional image should project an element image with a projection angle to the left of the three-dimensional image. Similarly, the optical element on the right side of the reproduced three-dimensional image should project the element image with a projection angle to the right of the three-dimensional image. Further, the optical elements below the three-dimensional image should project an upward image through the element images that are just below the three-dimensional image. Moreover, the floating three-dimensional image that is displayed as floating in the air distances from a display plane. The floating image can be sunk down in the display plane in other embodiments.

Figure 3:
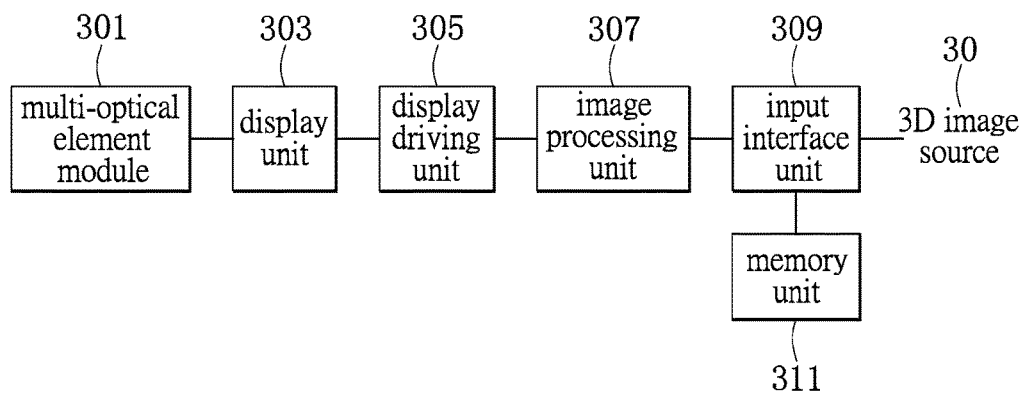
FIG. 3 shows a block diagram describing circuitry of the display apparatus for rendering the three-dimensional image according to one embodiment of the disclosure.

The above-mentioned apparatus reproducing the three-dimensional image can be implemented by a circuitry system. Reference is made to FIG. 3, which shows a circuit block diagram describing the system.

The display apparatus can be implemented by a combination of hardware and software in order to tune the 3D image. The hardware portion of the system can be such as a display apparatus. The circuit units that are electrically interconnected are schematically shown in the diagram. The main components of the system include a multi-optical element module 301 that is constituted of multiple optical elements. The multi-optical element module 301 renders the three-dimensional image. As described in the above embodiments, the optical element is a lens set that is constituted of one or more convex lenses or concave lenses, and the multi-optical elements form a lens array. The system includes a display unit 303 that includes a display panel for displaying an integral image. The integral image is reproduced through the multi-optical element module 301 so as to reproduce the three-dimensional image.

The circuitry system includes a display driving unit 305 serving as a driving circuit for the display panel. The display driving unit 305 drives the display panel to generate image control signals for the display unit 303 to display the integral image. The system includes an image processing unit 307 that, according to one embodiment, can be an image processing IC. The image processing unit 307 can be implemented by a digital signal processor or a module of software. This image processing unit 307 is the main circuit to perform the process for rendering the three-dimensional image and perform the computer sequences for tuning the 3D image. The image processing unit 307 is electrically connected with a memory unit 311. The memory unit 311 is such as a main memory of the system. The memory unit 311 is used to buffer image data, system operation instructions and calculation instructions. The memory unit 311 provides adequate instructions for calculation and the related image data. The memory unit 311 may act as a buffer that is used to buffer the data that is generated when the system is in operation.

The system includes an input interface unit 309 that is used to connect with an external 3D image source 30. When the image processing unit 307 starts to perform the reproduction of three-dimensional image, the three-dimensional image information is received via the input interface unit 309. The 3D image source 30 can be 3D images drawn by specific hardware and software, in one of the embodiments the information such as three-dimensional coordinates and chromaticity value that includes the chromatic information of the three-dimensional image and 3D spatial information are recorded in the 3D images. Further, a two-dimensional image and a depth map can be included in the information of the 3D image.

According to one of the embodiments, software instructions stored in the memory unit 311 are performed by the image processing unit 307 in order to process the method for tuning the 3D image. In the method, the integral image used for reproducing the 3D image is first acquired. The integral image is composed of a plurality of element images. The pixel values of every element image are obtained. A range of pixels are selected from the element image. The pixel values of this selected range of pixels are filled into multiple zones divided from every one-dimensional pixels of the element image. A new element image is therefore created. The plurality of new element images are configured to form a new integral image. This new integral image can effectively reduce the difference between image regions. The viewer won't be uncomfortable with the 3D image when he watches the image while moving around it because the excessively large pixel differences have been solved.

Next, a spatial relative relation is established according to the three-dimensional image information. In a practical case, the information may be reflected by a reference image that reflects the spatial relative relation. The reference image can reflect the three-dimensional image. The reference image is created through hardware of the system and by the user who sets up the system for rendering the three-dimensional image. After that, the system calculates the element images corresponding to the optical elements according to the physical information of the multi-optical element module 301. The system renders the integral image provided for the display unit 303 to display according to the element images of the multi-optical elements. The integral image is used to show the three-dimensional image through the multi-optical element module 301 when the display driving unit 305 drives the displaying.

The physical information relating to the multi-optical element module is mainly referred to the physical properties of the optical element, also a spatial relation between the spatial position for reproducing the three-dimensional image and each optical element. For example, the spatial relation includes a distance between the three-dimensional image and every optical element, e.g. the lens set, and a relative angle there-between; the spatial relation includes another distance between every optical element and the display panel of the display unit 303.

The spatial relation can be understood by placing the system in an identical spatial coordinate. By that, the distance and the relative angle between the three-dimensional image and every optical element are calculated according to the spatial coordinates of the three-dimensional image and the coordinates of every optical element, and the relative positions among the optical elements of the system can also be obtained. A distance between every optical element and the display panel can be obtained. The spatial relation may also include the relative position of each optical element of the multi-optical element module. The spatial relation also includes a distance between every optical element and the display panel. The spatial relation is introduced to the calculation with the sizes of image pixels. The various spatial relations become the inputs for the process for rendering the three-dimensional image while displaying the 3D image. The inputs of the method further include a viewing position of the user so as to set up an oblique angle for displaying the three-dimensional image. A ray tracing aspect is then introduced to the method in order to create the plurality of element images, and the display panel displays the integral image that is not yet reproduced.

Figure 4:
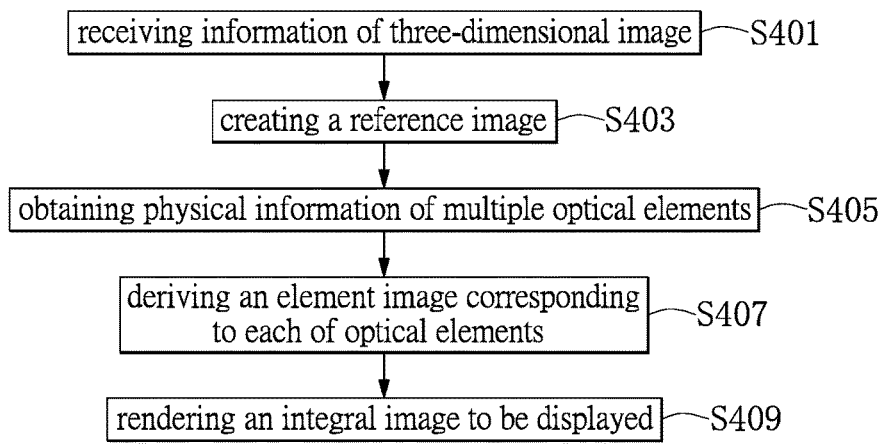
FIG. 4 shows a flow chart describing a process for rendering the three-dimensional image in one embodiment of the disclosure.

FIG. 4 shows a flowchart describing the method for reproducing the three-dimensional image using the display apparatus according to one embodiment of the disclosure. Under the premise of achieving the same result, a simple change in the following sequence of steps will not affect the embodiments of the method.

The process starts with step S401. The system receives information from an external image source via an input interface unit. In one embodiment, the received information includes chromatic information and 3D spatial information of the three-dimensional image. The 3D spatial information is exemplified as the information of a plane image and a depth map, or a set of coordinates and chromaticity value. The information of the plane image includes pixel coordinates (x,y) and chromaticity value. The depth map records a depth value (z value) of every pixel of the plane image. The depth map allows the system to reproduce the 3D image by describing the spatial positions through the 3D coordinates (x,y,z). The chromaticity value is then added for accurately showing the colors of the 3D image.

After that, in step S403, the system creates a reference image according to the received three-dimensional image information and user's requirements. The user's requirements are, for example, the user's viewing position, or a projection position of the 3D image. The system can automatically detect the user's viewing position according to the position of the user's eyeballs and accordingly create the reference image. The reference image is used to represent the 3D coordinates and chromaticity value of the display image. In one embodiment, the original three-dimensional image inputted to the system is converted to the reference image through a coordinate transformation. A coordinate transformation algorithm is particularly utilized to compute a set of transformation parameters.

Next, in step S405, the system obtains the physical information of multiple optical elements. The physical information includes the size and properties of the optical element, coordinates, size and curvature of the single lens set and the lens array, and the spatial relations of the optical elements. The spatial relations of the optical elements include the spatial position related to the single optical element, the spatial relation between each optical element and the display unit or display panel, and the spatial relation between the spatial position and every optical element. In step S407, the system establishes a coordinate transformation function between the original information of the three-dimensional image and the reference image. Through the coordinate transformation algorithm, the system uses the physical information of the optical elements and the coordinate transformation function to derive the element images corresponding to the optical elements from the reference image.

In step S409, a displayed integral image can be rendered from the element images that correspond to multiple optical elements of the display apparatus. More specifically, the element images are provided for the display unit including the display panel and backlight module of display apparatus to display the integral image. The integral image finally becomes the three-dimensional image through the multi-optical elements. The three-dimensional image is consistent with the reference image that can be set up by users or generated by the system.

It is noted that the reference image is rendered based on the positions of the optical elements of the display panel. The optical elements can be set up in the display panel in one-to-one, one-to-multiple or multiple-to-one manner. To render the reference image, the system does not have to refer to the user's viewing position. However, the system still allows the user to view the three-dimensional image from an oblique viewing angle. Therefore, the element images may be altered based on a specific circumstance. The three-dimensional image can be reproduced in a floating manner above the display apparatus, in a sinking manner below the display apparatus, or in front of or at the rear of the display apparatus when the lights are converged through the multi-optical elements. The algorithm acknowledges the diversities among the element images and the integral image from the reference image based on the user's requirements, including the user's viewing position.

Figure 5:
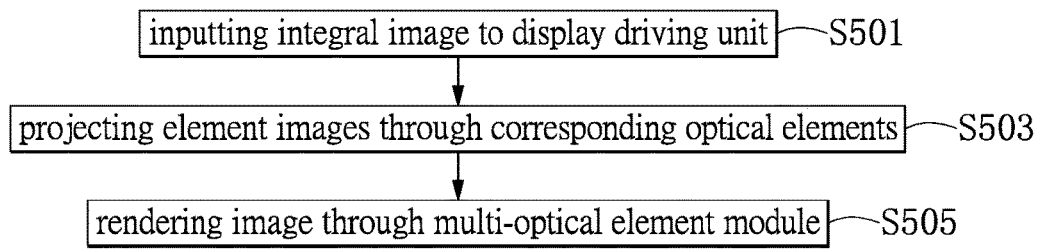
FIG. 5 shows another flow chart describing a process for rendering the three-dimensional image in one further embodiment of the disclosure.

Reference is next made to FIG. 5, which shows a flowchart depicting the process for rendering the three-dimensional image in a display apparatus according to one embodiment of the disclosure. The 3D image is imaged by the display apparatus. The relative positions of the three-dimensional image and the display apparatus are not limited in the present embodiment. The aspect of the method can also be applicable to render one or more 3D images through two or more display apparatuses in one system.

The system renders the reference image that is used to reflect the spatial position and chromaticity value of the three-dimensional image to be displayed. The system renders the element image and the integral image assembling the element images according to the reference image. In step S501, the integral image is inputted to the display driving unit of the system. The display driving unit acts as a driving circuit for driving the display unit to display the image. The integral image is thus displayed through the multi-optical element module. In step S503, the element images are respectively reproduced through their corresponding optical elements. Finally, in step S505, the three-dimensional image is reproduced at a specific spatial position through the multi-optical element module.

In the process of imaging, the three-dimensional image can be displayed above, below, in front of or behind a display plane formed through the multi-optical elements of the display apparatus. Reference is made to the schematic diagrams shown in FIG. 1 and FIG. 2. If the three-dimensional image information associates with a three-dimensional video, a series of reference images reflecting the altered spatial relative relations are created and a series of integral images are outputted. The three-dimensional video is displayed through the multi-optical elements.

It is worth noting that, as the lens array shown in FIG. 1 or FIG. 2, the display apparatus reproduces the 3D image from the integral image by re-integrating the images through the lens array. While reproducing the 3D image, especially the image with a certain bias angle, the circuitry system in the display apparatus can automatically exclude some related element images that may cause image deviation when rendering the three-dimensional image with a specific deflected angle. The deviation image can be determined by referring to the reference image. The element images that cause the deviation image can be excluded in advance or after comparing the reproduced image with the reference image. In practice, the system can adjust, select or delete the element images that cause the image deviation, and then render the integral image. For example, the marginal element images may be excluded in advance since they could generate deflected images through the projection process.

Figure 6:
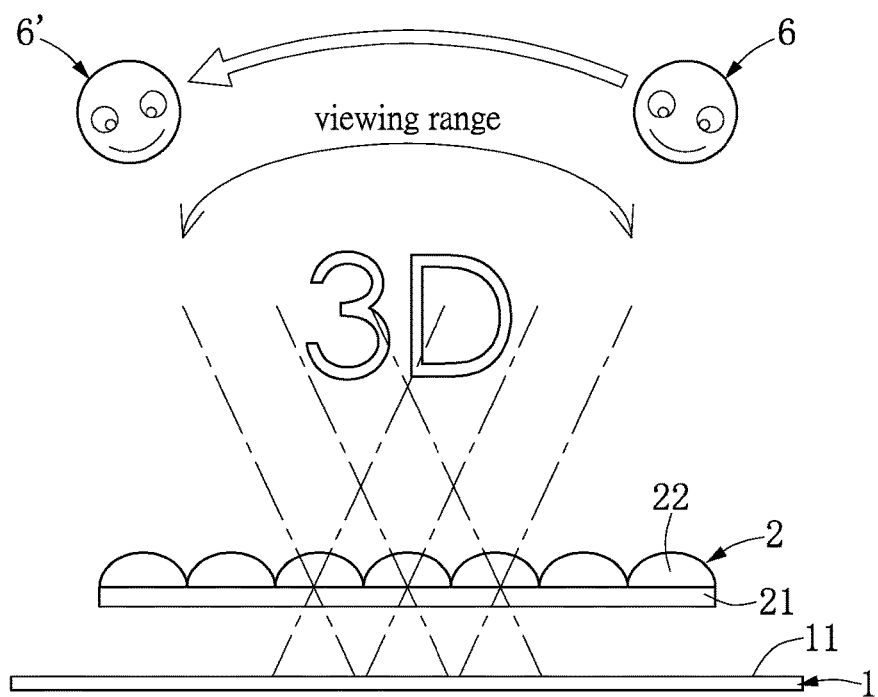
FIG. 6 shows a schematic diagram depicting that a viewer moves around while seeing a 3D image.

FIG. 6 shows that a viewer watches the 3D image while moving his position around the display apparatus. The viewer at position 6 watches the 3D image "3D" which is reproduced by multiple plane image regions projected by the display apparatus through the multiple lens assembly 22 of the multi-optical element module 2.

When a viewer moves from a first position 6 to a second position 6' within a viewing range, the viewer's sight moves accordingly from a region to another region of the 3D image "3D." The image may occur jittering due to excessively large difference between pixels, thus resulting in uncomfortable phenomenon toward the viewer's sight. The method solves the uncomfortable phenomenon by tuning smoothness of the element images that are used to reproduce the 3D image in accordance with one of the embodiments.

Through the method for tuning the element image, a certain level of smoothness of the 3D image can be successfully achieved in order to solve the problem of excessively large pixel difference between the adjacent image regions. The smoothness can be implemented by a software process that is performed by an image processing unit of the display apparatus. Reference is made to the flow chart as shown in FIG. 7.

Due to excessively large image difference between the image regions, the viewer may see the jittering or erroneous images as the viewer left-to-right, back-to-forth or up-to-down moves around the display apparatus. It should be noted that when the viewer's sight moves from one image region to another region of the 3D image while he moves around the display apparatus, the difference between the image regions causes the jittering or erroneous image. One of aspects of the method is to tune the differences in the element images that form the integral image in order to increase smoothness of the integral image. Therefore, the uncomfortable phenomenon can be solved. However, an excessive tuning of the smoothness, e.g. excessively small selected range of pixels, may also reduce visual effect of the three-dimensional image. Therefore, the display environment relating to the physical information of the multi-optical elements of the display apparatus should be taken into consideration while selecting the range of pixels in the one-dimensional pixels of the element image and dividing the multiple zones.

Figures 7, 8:
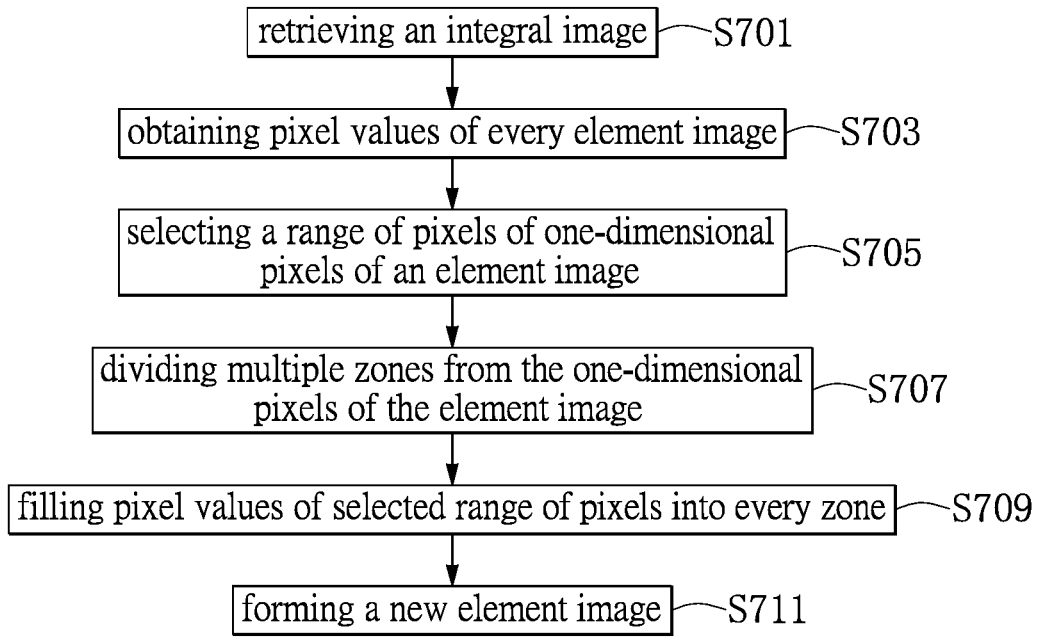
FIG. 7 shows a flow chart describing a method for tuning a 3D image according to one embodiment of the disclosure.
FIG. 8 shows a schematic diagram of an element image.

Reference is made to FIG. 7, which shows a flow chart depicting the method in one embodiment of the disclosure. In step S701, an integral image for reproducing a 3D image is acquired. The integral image is composed of a plurality of element images formed through lens sets of multi-optical elements of the display apparatus. The element image is generally a two-dimensional image with M×N pixels. The method for tuning 3D image is adapted to the two-dimensional pixels.

Next, such as in step S703, the pixel values of every element image can be obtained through a software process. The pixel value is generally indicative of a chromaticity value and a luminosity value. In step S705, a selection window is defined in the process of selecting a certain range of pixels from the one-dimensional pixels of the element image according to display environment and requirement automatically. In the meantime, or in different steps, such as in step S707, the one-dimensional pixels of the element image are divided into multiple zones of pixels. The multiple zones can be equally or not equally divided from the one-dimensional pixels of the element image and accordingly have the same or different number of pixels.

In step S709, the pixel values of the selected range of numbered pixels are filled into the multiple zones in every one-dimensional pixels of the element image in an ascending order or in a descending order according to pixel numbers of the selected pixels. The multiple zones can be filled with continuously-duplicate pixel values with the numbers in the ascending order or the descending order. In step S711, the pixel values can be filled into the multiple zones in one or a combination of the above-mentioned ways so as to form a new element image. This new element image is therefore the smoothness-tuned element image. After repeating the steps of selecting the range of pixels in the one-dimensional pixels of the element image, and filling the pixel values of the selected pixels into the multiple zones divided from the one-dimensional pixels, a new integral image is created.

The new integral image is used to reproduce the 3D image by projecting the integral image through a lens array composed of a plurality of lens sets. The light produced from the integral image is changed by refraction and transmittance caused by the physical properties such as texture and curvature of the lens of the multi-optical element module in the display apparatus. The texture and curvature of the lens act as one of factors to select the range of pixels and to divide the pixels into the zones. The number of the lens sets in the lens array, their arrangements and the disposal of the display panel can define a height, a range of viewing angles and resolution of the 3D image to be displayed.

It should be noted that the pixel value of every pixel can be a chromaticity value and a luminosity value. The pixel includes subpixels of red, green and blue that constitutes its own chromaticity value in an RGB color space. A CMYK color space indicating Cyan, Magenta, Yellow and Black can also be used.

Figure 9:
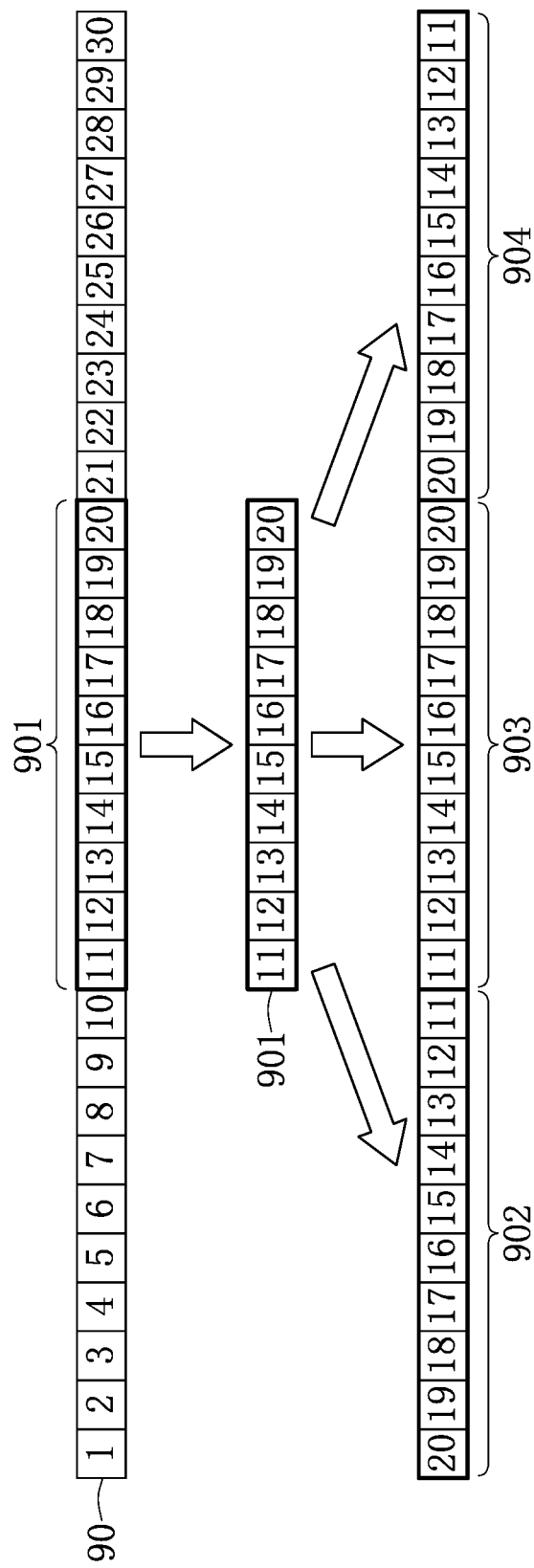
FIG. 9 schematically shows multiple zones of an element image filled with pixel values of a selected zone in one embodiment of the disclosure.

The new element images are configured to form the new integral image through the method for tuning the 3D image. The method can also be adapted to another dimension of the element image. The selection of the range of pixels in the one-dimensional pixels is essentially based on the physical information relating to the display. FIG. 8 exemplarily shows an element image. One element image includes pixels over two dimensions of the image. The pixels of every dimension of the element image can be numbered. Reference is made to FIG. 9, which schematically shows filling the pixel values of one-dimensional pixels of an element image into multiple zones.

FIG. 9 shows one-dimensional pixels 90. The pixels are orderly numbered from 1 to 30. As requires, a software procedure is performed to set up a selection window in order to decide a range of pixels, e.g. the pixels 901. It is noted that this range of pixels is selected in this case because the pixels close to the middle portion generally contain more complete image information. However, the selection of any range of pixels can be made based on a practical need.

In the current example, the pixels 901 contain 10 pixels. The one-dimensional pixels of the element image are divided into multiple zones, e.g. the zones 902, 903 and 904. The pixel values within the selection window are filled into the pixels in each zone. In one embodiment, the pixel values of the selected range of the pixels are used to fill into the zone 902, the zone 903 and the zone 904 according to their pixel numbers in both descending order and ascending order. The pixel values filled into the zone 902 are from pixel number 20 to pixel number 11 in a descending order. The pixel values filled into the zone 903 are from pixel number 11 to pixel number 20 in an ascending order. The pixel values filled into the zone 904 are from pixel number 20 to pixel number 11 in a descending order. Thus, it is shown that the pixels around the seam sections between the zones 902, 903 and 904 have the approximate values. The scheme of tuning the smoothness can be applied to other rows of pixels of the element image. The method can effectively improve the smoothness of the element image.

Figure 10:
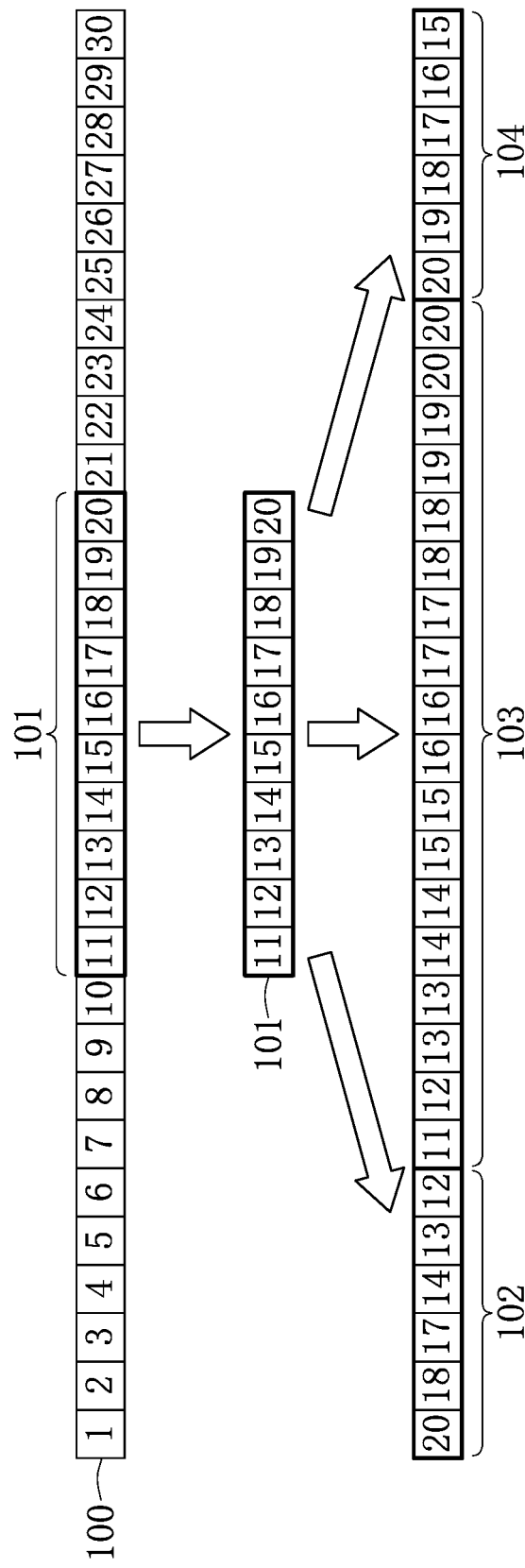
FIG. 10 schematically shows another embodiment that depicts multiple zones filled with the pixel values of a selected zone in another embodiment of the disclosure.

FIG. 10 shows a schematic diagram of another element image that is filled in the selected pixel values in another embodiment. A range of pixels 101 are selected from the one-dimensional pixels 100 numbered from 1 to 30. The selected pixels are also close to the middle portion of the one-dimensional pixels 100. The zones 102, 103 and 104 are not equally divided from the one-dimensional pixels 100 in the current example.

The pixel values of the pixels numbered from 20 to 12 are filled into the zone 102 in a descending order according to pixel numbers of the pixels. It should be noted that the pixel numbers of the pixel values filled into the zone 102 may not be continuous. A difference between the pixel values at the edge pixel of the zone 102 and the edge pixel of its adjacent zone, e.g. the zone 103, is configured to be confined within a certain range of value. The pixel values of the pixel numbered from 11 to 20 are filled into the zone 103 in an ascending order according to pixel numbers of the pixels. It is noted that part of the pixel values filled into the zone 103 may be in continuously duplicate. The pixel values of the pixels numbered from 20 to 15 are filled into the zone 104 in a descending order according to pixel numbers of the pixels. The pixel values of several seam sections between the zones 102, 103 and 104 are approximate. This scheme can be adapted to other rows of the element image for improving the smoothness.

Figure 11:
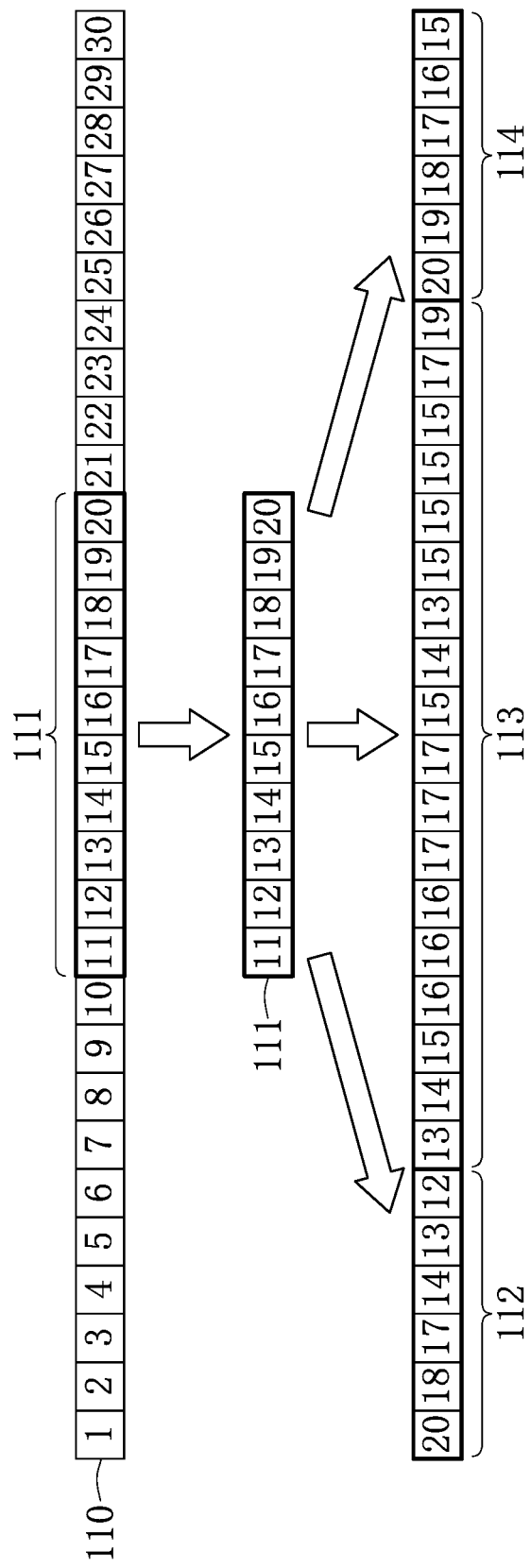
FIG. 11 schematically shows one further embodiment that depicts multiple zones filled with the pixel values of a selected zone in one further embodiment of the disclosure.

Another one-dimensional pixels 110 numbered from 1 to 30 are shown in FIG. 11. A range of pixels 111 are selected from the one-dimensional pixels 110. The one-dimensional pixels 110 are divided into the zones 112, 113 and 114. The pixel values filled into the zones 112, 113 and 114 of the one-dimensional pixels 110 can be respectively in an ascending order, in a descending order or with continuously-duplicate pixel values according to pixel numbers of the pixels. The continuously-duplicate pixel values form a smaller range of the same pixel values within the zones. The pixel values filled into the zones may also be in any combination of the ascending order, the descending order or with the continuously-duplicate values according to pixel numbers of the pixels. The differences of the pixel values between the edge pixels of the zones should be confined within a range of value.

In the current example, the pixel numbers of the pixel values filled into the zone 112 are from 20 to 12 in a descending order. The pixel numbers of the pixel values filled into the zone 112 may not be continuous. The pixels with the pixel values filled into the zone 113 are arranged in a combination of an ascending order, a descending order and with duplicate pixel values according to pixel numbers of the pixels. The diagram shows the zone 113 filled with the pixel values of pixels numbered by 13, 14, 15, 16, 16, 16, 17, 17, 17, 15, 14, 13, 15, 15, 15, 15, 17 and 19. Part of the pixels are in an ascending order and part of the pixels are in a descending order according to pixel numbers of the pixels in the zone 113; and another part of pixels have continuously-duplicate pixel values. For example, the pixels numbered 16, 17 and 15 are in continuously duplicate in the zone 113. The zone 114 is filled with the pixel values of the pixels arranged in an ascending order according to pixel numbers of the pixels. Similarly, the pixel values of the seam sections between the zones 112, 113 and 114 should be approximate for keeping proper smoothness.

It should consider if the selections of the pixels within the selection windows 901, 101 and 111 eliminate the three-dimensional property. If the selection window is too small, the three-dimensional property will be reduced due to undue smoothness. Otherwise, the uncomfortable viewing experience cannot be solved if the selection window is too large.

In sum, the method for tuning the 3D image and the system for implementing the method re-create a smoothed integral image by improving the smoothness of the element images. The 3D image can therefore be tuned for solving the uncomfortable viewing experience due to the excessively large difference between the pixel regions.

It is intended that the specification and depicted embodiments be considered exemplary only, with a true scope of the invention being determined by the broad meaning of the following claims.

What is claimed is:

1. A method for tuning a three-dimensional image, comprising:
    acquiring an integral image that is composed of a plurality of element images that are used to reproduce a 3D image through a lens array;
    extracting pixel values from each of the element images;
    selecting a range of numbered pixels of every line of one-dimensional pixels of the element image;
    according to pixel numbers of the selected pixels, filling the pixel values of the selected pixels of the one-dimensional pixels into multiple zones divided from the one-dimensional pixels of the element image so as to form a new element image; and
    forming a plurality of new element images by repeating steps of selecting the range of pixels of one-dimensional pixels of each of the element image and filling the pixels values of the selected pixels into multiple zones divided from the one-dimensional pixels of each of the element image, so as to form a new integral image;
    wherein the element image is a two-dimensional image and the method is applied to the two-dimensional pixels of the element image, and the pixel values of the selected pixels are filled into multiple zones divided from the one-dimensional pixels of the element image in an ascending order after a descending order, a descending order after an ascending order, and with continuously-duplicate pixel values according to pixel numbers of the selected pixels.

2. The method as recited in claim 1, wherein a determination of the range of pixels selected from the one-dimensional pixels is based on physical information of multi-optical elements of a display apparatus that is used to display the 3D image.

3. The method as recited in claim 2, wherein the physical information of the multi-optical elements at least includes a spatial relation between spatial position for reproducing the 3D image and every optical element, and another spatial relation between every optical element and a display panel of the display apparatus.

4. The method as recited in claim 1, wherein the step for forming the integral image further comprises:
    receiving three-dimensional image information;
    establishing a spatial relative relation according to the three-dimensional image information;
    obtaining physical information relating to multi-optical elements of a display apparatus;
    deriving the element image corresponding to each optical element according to the spatial relative relation and the physical information relating to the multi-optical elements; and
    forming the integral image from the multiple element images with respect to the multi-optical elements for the display apparatus to display the 3D image through the multi-optical elements.

5. The method as recited in claim 1, wherein the pixel value includes a chromaticity value and a luminosity value.

6. The method as recited in claim 5, wherein a determination of the range of pixels selected from the one-dimensional pixels is based on physical information of multi-optical elements of a display apparatus that is used to display the 3D image.

7. The method as recited in claim 6, wherein the physical information of the multi-optical elements at least includes a spatial relation between spatial position for reproducing the 3D image and every optical element, and another spatial relation between every optical element and a display panel of the display apparatus.

8. The method as recited in claim 1, wherein a determination of the range of pixels selected from the one-dimensional pixels is based on physical information of multi-optical elements of a display apparatus that is used to display the 3D image.

9. The method as recited in claim 8, wherein the physical information of the multi-optical elements at least includes a spatial relation between spatial position for reproducing the 3D image and every optical element, and another spatial relation between every optical element and a display panel of the display apparatus.

10. The method as recited in claim 8, wherein the step for forming the integral image comprises:
receiving three-dimensional image information;
establishing a spatial relative relation according to the three-dimensional image information;
obtaining physical information relating to the multi-optical elements of a display apparatus;
deriving the element image corresponding to each optical element according to the spatial relative relation and the physical information relating to the multi-optical elements; and
forming the integral image from the multiple element images with respect to the multi-optical elements for the display apparatus to display the 3D image through the multi-optical elements.

11. A display apparatus, comprising:
a multi-optical element module that is used to render a 3D image;
a display unit that is used to display an integral image and the 3D image through the multi-optical element module;
a display driving unit that is used to drive the display unit to display the integral image; and
an image processing unit that is used to perform a method for tuning a 3D image comprising:
acquiring the integral image that is composed of a plurality of element images;
extracting pixel values from each of the element images;
selecting a range of numbered pixels of every line of one-dimensional pixels of the element image;
according to pixel numbers of the selected pixels, filling the pixel values of the selected pixels of the one-dimensional pixels into multiple zones divided from the one-dimensional pixels of the element image in an ascending order after a descending order, a descending order after an ascending order, and with continuously-duplicate pixel values so as to form a new element image; and
forming a plurality of new element images by repeating steps of selecting the range of pixels of one-dimensional pixels of each of the element image and filling the pixels values of the selected pixels into multiple zones divided from the one-dimensional pixels of each of the element image, so as to form a new integral image.

12. The display apparatus as recited in claim 11, wherein a determination of the range of pixels selected from the one-dimensional pixels is based on physical information of multi-optical elements of a display apparatus that is used to display the 3D image.

13. The display apparatus as recited in claim 12, wherein the physical information of the multi-optical elements at least includes a spatial relation between spatial position for reproducing the 3D image and every optical element, and another spatial relation between every optical element and a display panel of the display apparatus.

14. The display apparatus as recited in claim 13, wherein the optical element is a lens set that is constituted of one or more convex lenses or concave lenses, and the multi-optical elements form a lens array.

15. The display apparatus as recited in claim 14, wherein the step for forming the integral image comprises:
receiving three-dimensional image information;
establishing a spatial relative relation according to the three-dimensional image information;
obtaining physical information relating to the multi-optical elements of the display apparatus;
deriving the element image corresponding to each optical element according to the spatial relative relation and the physical information relating to the multi-optical elements; and
forming the integral image from the multiple element images with respect to the multi-optical elements for the display apparatus to display the 3D image through the multi-optical elements.

* * * * *